United States Patent [19]

Eagar et al.

[11] 4,365,134
[45] Dec. 21, 1982

[54] METHOD OF RESISTANCE WELDING

[75] Inventors: Thomas W. Eagar, Belmont, Mass.; Joseph G. Kaiser, Wallingford, Conn.; Gregory J. Dunn, Cambridge, Mass.

[73] Assignee: Massachusetts Institute of Technology, Cambridge, Mass.

[21] Appl. No.: 221,591

[22] Filed: Dec. 31, 1980

[51] Int. Cl.³ .................... B23K 11/16; B23K 11/34
[52] U.S. Cl. ................................. 219/118; 219/92
[58] Field of Search ................. 219/110, 92, 118

[56] References Cited

U.S. PATENT DOCUMENTS

| | | | |
|---|---|---|---|
| 1,568,080 | 1/1926 | Meadowcroft | 219/92 X |
| 3,149,221 | 9/1964 | Watter | 219/110 |
| 3,217,403 | 11/1965 | Pekar | 219/92 X |
| 3,586,815 | 6/1971 | Eijnsbergen | 219/110 |
| 4,048,463 | 9/1977 | Bennett | 219/92 X |

*Primary Examiner*—Elliot A. Goldberg
*Attorney, Agent, or Firm*—Arthur A. Smith, Jr.; Thomas J. Engellenner

[57] ABSTRACT

After measuring the bulk resistance the surface of high strength low alloy steel material is treated to form a high resistance coating on its surface. When resistance welding the material the coating permits weld formation without significant expulsion or excessive electrode force over a wide range of operating conditions.

4 Claims, 4 Drawing Figures

METHOD OF RESISTANCE WELDING

DESCRIPTION

Technical Field

This invention relates to resistance spot welding and to methods of treating materials prior to welding.

BACKGROUND

The process of resistance spot welding has become one of the most widely accepted means of joining metallic parts. Typically, the materials to be joined are placed between two water cooled copper alloy electrodes. A very high current is then passed between the electrodes. As the current flows through and between the workpieces, heat is generated. The heat results in the formation of a weld "nugget" at the "faying" interface between the two workpieces.

The nature of mass production spot welding requires the ability to make thousands of welds without machine readjustment. For example, the average automobile contains more than 5000 resistance spot welds. In automated welding the current, electrode force and welding time may be set at desired levels using machine controls, however, electrical resistance is a property of the material being welded. As the weld develops, the resistance varies dynamically. Versatility is afforded in resistance spot welding by choosing between low current, long time welding and high current, short time welding. Thus, a range of acceptable welding conditions exists for any material, given its composition and thickness. The maximum current for a given weld time is determined by the expulsion of liquid metal between the sheets being welded. The minimum current is determined by the minimum acceptable nugget diameter. Both expulsion and small weld nuggets produce welds with inferior mechanical strength.

To allow for parameter variations during a welding run, it is desirable to use material with the greatest welding current range. While welding time is accurately controlled by modern welding machines, welding current density is a much more difficult parameter to control. This is due to machine disparities, "mushrooming" or flattening of the electrode tips, and to resistance variations in the sheet metal. Because of this, some manufacturers require that sheet steel demonstrate an acceptable welding range of several thousand amperes at 12 cycles.

Traditionally, manufacturers have relied upon low-carbon sheet steel as their welding material because of its superior characteristics. There is about a 1000° F. difference between the softening and melting temperatures of low carbon steel, permitting it to be weldable over a wide time and current range. For comparison, aluminum has a short plastic range of less than 300° F., making it more difficult to weld successfully.

Prompted by the incentives to produce lighter articles, manufacturers, particularly automakers, find themselves no longer using only low carbon sheet steel. New alloy developments now offer the substitution of higher strength to weight ratio, low alloy, (HSLA) steels. These steels, which increase their strength through compositional variations, also exhibit a marked decrease in their resistance spot weldability.

Therefore, there exists a need to improve the weldability of materials, particularly (HSLA) steels and other materials which presently exhibit a narrow range of acceptable welding currents and time periods.

DISCLOSURE OF THE INVENTION

An improved method of welding to widen the acceptable ranges of welding time and welding current for many materials lies in treating the surfaces of the material to modify the surface resistance in relation to the bulk resistance. This method may be practiced on materials which because of their high bulk resistance presently exhibit welding problems. In particular, this method results in substantial improvements in the weldability of (HSLA) steel when such steel is treated to increase its surface resistance.

In general, it has been found that improved weldability for many materials, hitherto unacceptable for machine welding, resides in treating the materials to achieve optimal surface resistance to bulk resistance ratios.

BRIEF DESCRIPTION OF THE DRAWINGS

The features and advantages of the invention will be apparent from the following description of preferred embodiments of the invention, as illustrated in the accompanying drawings.

DESCRIPTION OF THE PREFERRED EMBODIMENTS

Figure 1:
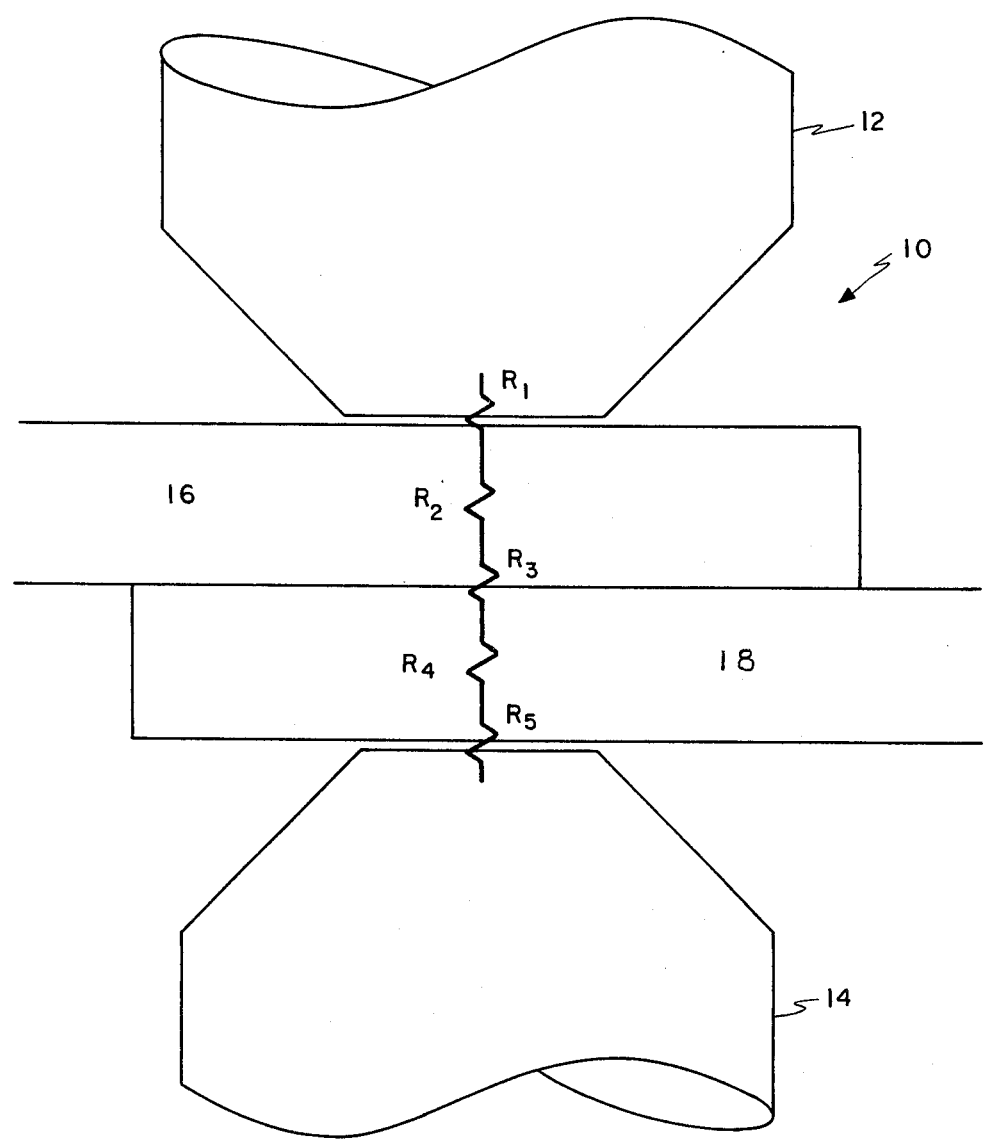
FIG. 1 is a schematic cross-sectional view of a welding machine and workpieces.

FIG. 1 is a schematic view of a welding operation 10 and shows five series resistances typically found in spot welding. Electrodes 12 and 14 apply a force on sheet materials 16 and 18 and introduce a current through and between the sheets 16 and 18.

In FIG. 1 the total welding resistance may be thought of as a series resistance of five loads. They are the two electrode-sheet interface resistances, $R_1$ and $R_5$; the two bulk material resistances, $R_2$ and $R_4$; and the faying interface resistance, $R_3$. Each of these resistances is a function of temperature. The interface resistances are determined by the thermal, electrical and mechanical behavior of the surface of the material. The faying resistance, $R_3$, drops to zero as the nugget is formed.

Figure 2:
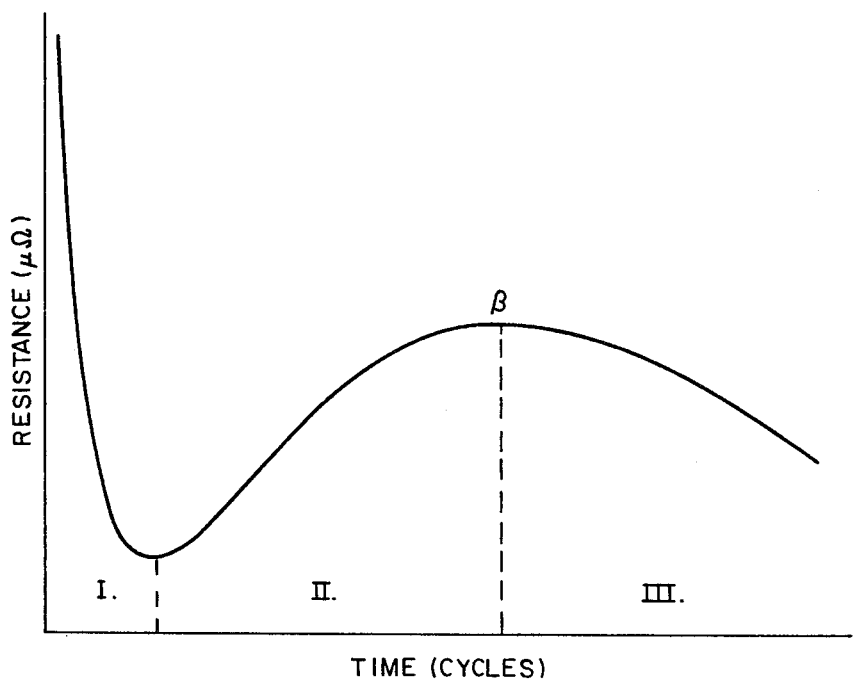
FIG. 2 is a graph of dynamic resistance over time for a typical welding material.

During welding operations, the cumulative resistance $(R_1+R_2+R_3+R_4+R_5)$ exhibits a dynamic response over time. As shown in FIG. 2, for a typical welding material the dynamic cumulative resistance first rapidly decreases, reaches a transitory minimum, then increases to a maximum, termed the $\beta$ peak, followed by a gradual decline with time.

The $\beta$ peak, in FIG. 2 signifies the point in time where temperature begins to stabilize, with nugget growth starting to dominate the resistance properties, and where melting begins to occur. Welds which are terminated before or shortly after the $\beta$ peak result in undersized nuggets.

The three regions identified under the curve in FIG. 2 can be briefly described as follows: In Region I there is a breakdown of contact insulation or fritting, while in Region II, there is increasing dynamic resistance due to the temperature coefficient of bulk resistance, and in Region III, the materials exhibit growth of the fused metallic bond and decreasing dynamic resistance.

Higher current welding can shift the $\beta$ peak to earlier times. Conversely, at lower currents the heating rate is slower, thus requiring more time for melting.

Material parameters such as composition also have a marked effect on dynamic resistance. Steels of various compositions exhibit the characteristic initial spike followed by a secondary $\beta$ peak, but compositions of higher carbon or alloy content exhibit greater overall resistance levels than do low carbon steels. Higher alloyed steels develop the $\beta$ peak at earlier weld times than low carbon steel. As would be expected, the rate of heat generation is greater for higher carbon or more highly alloyed steels.

When too much heat is generated in the workpieces, the result is expulsion of the molten metal prior to the formation of an acceptable nugget. Excessive heating can also lead to softening of the metal surrounding the nugget and failure of the seal. Under optimum welding conditions, dynamic resistance should gradually decrease 30-35% after the $\beta$ peak. When no welding occurs, a 0-20% decrease is reported, while a precipitous decrease of 60-70% is indicative of expulsion.

Figure 3:
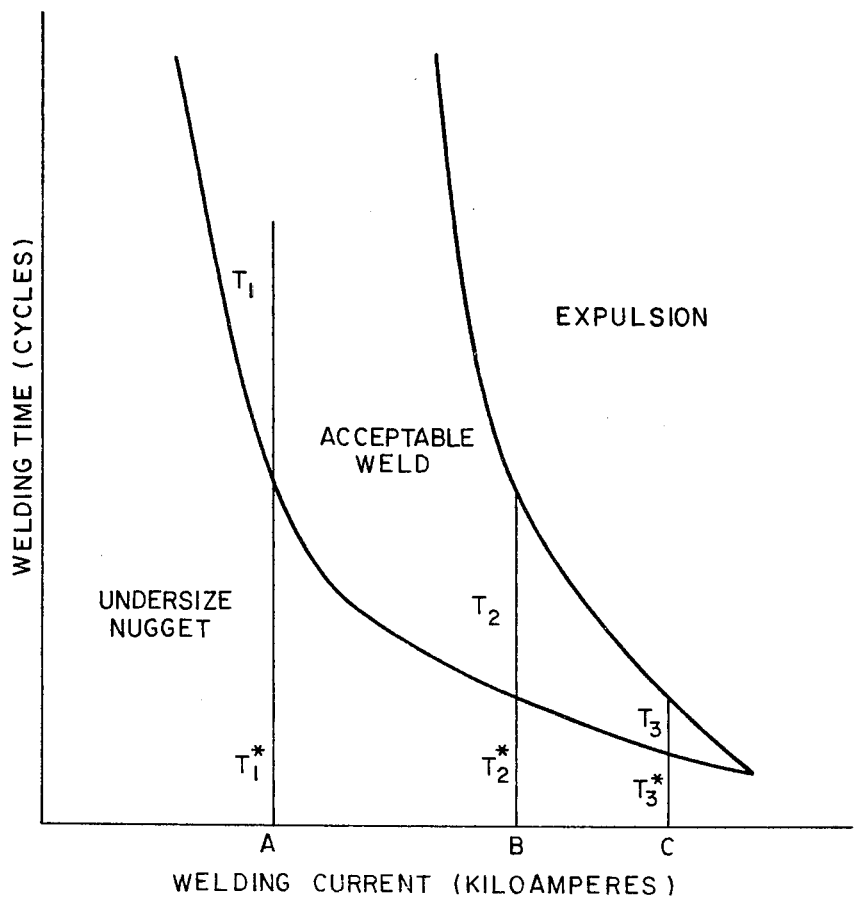
FIG. 3 is a typical welding lobe diagram showing the effects of variation of welding time and welding current.

It is helpful to consider the range of acceptable welding conditions graphically; FIG. 3 shows a diagram, termed a welding "lobe", for a typical welding material. Vertical slices of the lobe can be considered as being a series of constant current vs. time plots. In other words, for a given current, for example current "B", the lobe defines the necessary time, $T_2^*$, for the interface to melt and form an acceptable nugget. Once the initial nugget is formed, the distance, $T_2$, between the initial nugget line and the maximum line defines the time that the current "B" can remain applied without causing excessive melting and expulsion. It should be remembered that the faying resistance ($R_3$) equals zero at the initial nugget line, hence bulk heating effects predominate inside the lobe region.

In the case of lower current, for example, current "A", more heat is allowed to dissipate and nugget growth takes place over a broader time period. It is obvious that at lower currents nugget growth takes longer to complete and, hence, the process is less efficient. Moreover, the longer the nugget actually takes to be completed the more it will be influenced by slight variations in heat loss and heat generation.

The characteristic boundary line between acceptable and undersized weld nuggets is caused by the balance between rapid heating at the faying interface and more diffuse heating of the bulk. At low currents, nugget growth takes place so slowly that the interfacial heat has time to diffuse into the bulk.

The other characteristic boundary line, that is the line between acceptable welds and expulsion, is determined by the softening of restraining material adjacent to the molten nugget. Softening results from the heat generated in the bulk and is therefore directly related to the bulk resistivity of the material. For expulsion to occur, two criteria must be met: (1) Molten metal must be present at the interface, i.e. sufficient heat must have been generated at the interface in order to cause melting, and (2) Sufficient heat must have been generated in the bulk to allow for softening of the seal region.

The shape of the so called tail or pinch off region of the lobe is predominently a function of the mechanics of short time nugget formation. At these high welding currents, the weld time is very short, nugget growth is rapid and becomes very unstable.

From the foregoing analysis of dynamic resistance curves and welding lobes we have discovered that it is desirable in resistance spot welding to rapidly generate sufficient, but not excessive heat at the faying interface. In addition, it is desirable to either minimize bulk heating or maximize heat loss into the electrodes. The practical application of these principles shows that the ratio of bulk resistance to interface resistance must lie within certain limits.

For many materials the $\beta$ peak of the dynamic resistance curve can be shifted to earlier times by increasing the surface resistance of the materials. Likewise, a wider lobe, in which the characteristic boundary line between acceptable and undersized nuggets is depressed, can be formed by increasing the surface resistance. Materials with higher electrical resistivities in particular, will be likely candidates for high surface resistance treatments. The higher the interface resistance, the greater is the rate of nugget formation at a given current. Surface resistance is not as critical a parameter in lower resistivity steels such as low carbon, since these lobes are sufficiently wide even for low surface resistances.

The determination of lobe shape for any welding condition can be defined in terms of three parameters: surface resistance, bulk resistance, and electrode force. Optimal electrode force is mainly a function of the mechanical strength of the sheet metal. If we assume that welding is carried out at an optimum electrode force, the lobe should be completely defined by the ratio of bulk resistance to surface resistance.

Additional benefits may be gained along with increased lobe width through the modification of interface resistance. Since there is a decreased dependence of lobe width on electrode force, it is possible to reduce electrode force without creating detrimental effects on the current range. Such a change could significantly reduce mushrooming, and increase the length of welding runs.

The welding of aluminum also conforms to the general hypothesis of lobe shape presented here. The high surface to bulk resistance ratio found for aluminum indicates relatively unstable process. It follows that stability could be improved by either reducing surface resistance or increasing the bulk resistance through alloying. Furthermore the use of domed electrodes increases stability by preventing the occurance of the peripheral melting phenomena in short time aluminum welding.

EXAMPLES

Two steel compositions of 1.3 mm (0.049 in) thickness were studied. Cold rolled low carbon sheet steel and cold rolled (HSLA) steel were chosen. The room temperature bulk resistance of the (HSLA) steel was roughly twice that of the low carbon steel. For each composition, surface conditions of high, medium and low resistance were studied. For both low carbon and (HSLA), a low surface resistance was achieved by degreasing in trichlorethylene followed by pickling in baths of sulphuric acid and of hydrochloric acid, completed by an alcohol rinse. This procedure was performed immediately prior to welding. An intermediate value of surface resistance was achieved for both compositions by welding in the "as received" condition. In this state, mill oil and light oxide were apparent on the steel surface.

Two types high resistance surfaces were prepared on the steels. In one treatment the steels were maintained at 250° F. for 96 hours under humid conditions. In the other treatment the steels received a 15 mg/sq.ft. phosphate coating to achieve high surface resistance. This spray treatment (trade name Granodine 400) was provided by Amchem, Inc. of Ambler, PA.

All welds were produced on a 75 kVA pneumatically operated welding machine equipped with synchronous controls. RMS current values were determined, without the use of blanking, on a commercially available current meter (Duffers model No. 273). An electrode tip diameter of 6.3 mm ($\frac{1}{4}$ in) was used throughout the study, as was a 30 cycle hold time.

Welding lobes were determined for all six combinations of composition and surface treatment. Since electrode force directly affects the magnitude and response of the interface resistance, a high, medium (optimum) and low force lobe was constructed for each resistance combination. Thus a $2 \times 3 \times 3$ matrix of steel welding conditions was studied.

The results of our work indicated that melting of the interface varied considerably for various surface conditions. Bulk resistivity controls bulk heating, softening, and therefore expulsion. Bulk heating in (HSLA) steels was found to achieve a given temperature approximately one cycle faster than in low carbon steels, hence (HSLA) steels are more susceptable to expulsion, since expulsion is related to overheating of the bulk.

Figure 4:
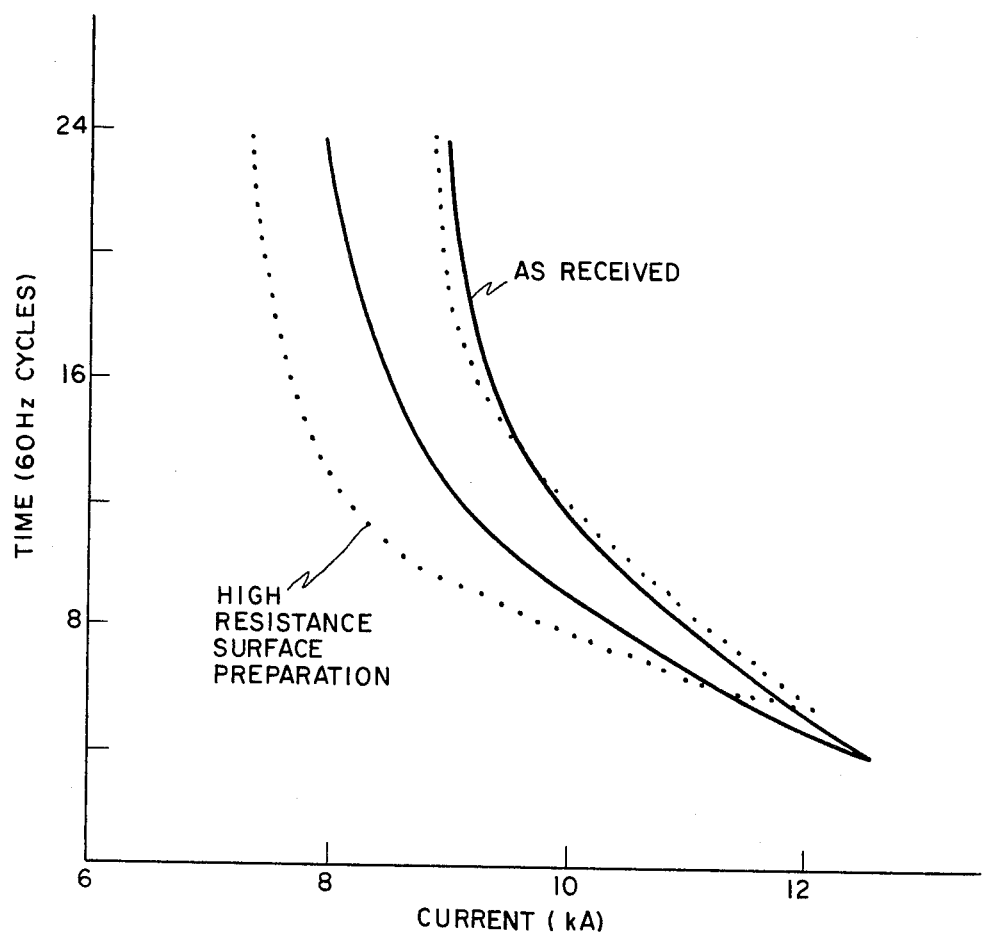
FIG. 4 is a welding lobe diagram showing weldability of (HSLA) steel with and without surface preparation.

FIG. 4 shows a comparison of welding lobes for 0.050 inch thick (HSLA) steel welded with 1050 lbs. electrode force. The solid lines show the extent of the welding lobe for (HSLA) steel welded in "as received" condition, while the dotted lines show the extent of the lobe for (HSLA) treated to increase its surface resistance. As FIG. 4 indicates, the (HSLA) lobe width was improved with higher surface resistance conditions. Higher surface resistances shifted the minimum lobe line to shorter times and lower currents, while the (HSLA) expulsion line remains virtually unchanged despite the shift of the minimum line.

What we claim is:

1. An improved method of resistance welding high strength low alloyed steel materials along a faying interface, the method comprising:
  (a) measuring the bulk resistance of said materials;
  (b) determining the optimal surface resistance for said materials so that when said materials are welded sufficient heat is generated at the faying interface while bulk heating of materials is minimized;
  (c) treating the surface of said materials to produce a coating which increases the surface resistance to obtain said optimal surface resistance and
  (d) resistance welding said treated materials.

2. The method of claim 1 wherein the step of treating said materials further comprises applying an oxidizing agent to said materials to increase their surface resistance.

3. The method of claim 1 wherein the step of treating said materials further comprises applying a phosphate coating to said materials to increase their surface resistance.

4. The method of claim 1 wherein the step of treating said materials further comprises maintaining the materials under humid conditions and at elevated temperatures for a sufficient time to increase their surface resistance.

* * * * *